United States Patent
Jensen et al.

(10) Patent No.: US 11,543,244 B2
(45) Date of Patent: Jan. 3, 2023

(54) RETROREFLECTOR COMPRISING FISHEYE LENS

(71) Applicant: HEXAGON TECHNOLOGY CENTER GMBH, Heerbrugg (CH)

(72) Inventors: Thomas Jensen, Rorschach (CH); Andreas Schwendener, Chur (CH); Zheng Yang, Friedrichshafen (DE); Johan Stigwall, St. Gallen (CH); Danick Brühlmann, Staad (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 700 days.

(21) Appl. No.: 16/576,690

(22) Filed: Sep. 19, 2019

(65) Prior Publication Data
US 2020/0096747 A1    Mar. 26, 2020

(30) Foreign Application Priority Data
Sep. 20, 2018   (EP) .................................. 18195689

(51) Int. Cl.
*G01C 15/00*    (2006.01)
*G01C 1/04*     (2006.01)
(Continued)

(52) U.S. Cl.
CPC ............ *G01C 15/006* (2013.01); *G01C 1/04* (2013.01); *G01C 11/02* (2013.01); *G01C 15/06* (2013.01); *G01S 7/481* (2013.01); *G02B 5/132* (2013.01); *G01S 17/42* (2013.01); *G02B 5/124* (2013.01); *G02B 26/0875* (2013.01); *G06T 2207/30181* (2013.01)

(58) Field of Classification Search
CPC .................................................... G01C 15/006
See application file for complete search history.

(56) References Cited

U.S. PATENT DOCUMENTS

| 6,667,798 B1 | 12/2003 | Markendorf et al. |
| 7,420,675 B2 * | 9/2008 | Giakos .................... G01J 3/447 356/367 |

(Continued)

FOREIGN PATENT DOCUMENTS

| DE | 10 2012 101 640 A1 | 8/2013 |
| EP | 1 200 853 B1 | 3/2003 |

(Continued)

OTHER PUBLICATIONS

European Search Report dated Apr. 4, 2019 as received in Application No. 18195689.7.

*Primary Examiner* — Michael A Berns
(74) *Attorney, Agent, or Firm* — Maschoff Brennan

(57) ABSTRACT

A reflector arrangement for position determination and/or marking of target points, comprising a retroreflector and a first sensor arrangement, by means of which the orientation measurement radiation passing through the retroreflector is acquirable. The first sensor arrangement comprises a first optical assembly providing a fisheye lens, and a first sensor, wherein the retroreflector and the first sensor arrangement are arranged in such a way that orientation measurement radiation passing through the retroreflector is projectable onto the detection surface of the first sensor by means of the first optical assembly.

15 Claims, 3 Drawing Sheets

(51) Int. Cl.
  *G01C 11/02* (2006.01)
  *G02B 5/132* (2006.01)
  *G01C 15/06* (2006.01)
  *G01S 7/481* (2006.01)
  *G02B 5/124* (2006.01)
  *G02B 26/08* (2006.01)
  *G01S 17/42* (2006.01)

(56) References Cited

U.S. PATENT DOCUMENTS

| | | |
|---|---|---|
| 7,583,373 B2 | 9/2009 | Schwarz |
| 8,817,066 B2 * | 8/2014 | Krishnan ........... H04N 5/23238 348/42 |
| 9,401,024 B2 * | 7/2016 | Kwiatkowski ............ G06T 7/73 |
| 10,054,439 B2 * | 8/2018 | Jensen ..................... G01S 17/86 |
| 10,209,059 B2 * | 2/2019 | Nagalla ................ G06F 3/0304 |
| 10,234,287 B2 * | 3/2019 | Siercks ................. H04N 5/2257 |
| 10,281,276 B2 * | 5/2019 | Siercks ............ H04N 5/232945 |
| 10,480,929 B2 * | 11/2019 | Nagalla ................ G01B 21/047 |
| 10,655,962 B2 * | 5/2020 | Siercks ................... G01C 11/02 |
| 10,724,860 B2 * | 7/2020 | Nishita ................. B64C 39/024 |
| 10,754,010 B2 * | 8/2020 | Hinderling .............. G01S 7/487 |
| 11,029,499 B2 * | 6/2021 | Lee ........................... G02B 9/62 |
| 11,054,258 B2 * | 7/2021 | Siercks ................... H04N 5/247 |
| 11,320,631 B2 * | 5/2022 | Liu ....................... H04N 5/2254 |
| 2015/0253137 A1 | 9/2015 | Jensen et al. |
| 2017/0201738 A1 * | 7/2017 | Lacaze ............... G01B 11/2545 |
| 2018/0017384 A1 | 1/2018 | Siercks et al. |
| 2020/0096610 A1 * | 3/2020 | Jensen .................. G01C 15/06 |
| 2020/0096747 A1 * | 3/2020 | Jensen ................. G01C 15/006 |

FOREIGN PATENT DOCUMENTS

| | | |
|---|---|---|
| EP | 1 686 350 A1 | 8/2006 |
| EP | 2 916 104 A1 | 9/2015 |

* cited by examiner

RETROREFLECTOR COMPRISING FISHEYE LENS

CROSS-REFERENCE TO RELATED APPLICATIONS

This application claims priority to European Patent Application No. 18195689 filed on Sep. 20, 2018, which is incorporated herein by reference.

FIELD OF THE INVENTION

The invention relates to a reflector arrangement preferably for use in the field of geodetic surveying, which reflector arrangement provides a determination of its own orientation relative to a surveying apparatus.

BACKGROUND

Surveying systems for determining positions in the field of geodesy or in the field of construction sites or construction are known in diverse forms. Examples thereof are systems composed of a stationary surveying apparatus comprising a direction and distance measuring device, such as e.g. a total station, and an auxiliary measuring instrument such as a plumb rod, for example, which marks a point to be surveyed or to be identified. One geodetic measuring apparatus from the prior art is described for example in the publication EP 1 686 350. Layout systems are known, moreover, composed of a stationary laser emitter, which generates a position reference by means of a laser beam, which position reference is receivable by a laser receiver at the point to be marked. Surveying activities are thus effected by the interplay of a stationary apparatus of known location, which thus offers a position reference, with a receiving or marking or targetable auxiliary measuring means, whereby it is possible to determine precisely the position of individual terrain points such as land surveying points or points at construction site objects, e.g. in the interior or exterior region of buildings or in road construction, with regard to position measurement or marking out.

Numerous different embodiments are known with regard to the configuration of the surveying apparatuses. Thus, e.g. modern total stations have microprocessors for digital further processing and storage of acquired measurement data. The apparatuses generally have a compact and integrated design, wherein coaxial distance measuring elements and also computing, control and storage units are usually present in an apparatus. Depending on the expansion stage of the total station, motorization of the targeting or sighting device and—in the case of the use of retroreflectors (for instance an all-round prism) as target objects—means for automatic target seeking and tracking can additionally be integrated. As a human-machine interface, the total station can comprise an electronic display/control unit—generally a microprocessor computing unit with electronic data storage means—with display and input means, e.g. a keyboard. The measurement data acquired in an electrical-sensor-based manner are fed to the display/control unit, such that the position of the target point is able to be ascertained, optically displayed and stored by the display/control unit. Total stations known from the prior art can furthermore have a radio data interface for setting up a radio link to external peripheral components such as e.g. to the auxiliary measuring instrument or to a handheld data acquisition apparatus, which can be embodied in particular as a data logger or field computer.

For sighting or targeting the target point to be surveyed, geodetic surveying apparatuses of the generic type comprise a telescopic sight, such as e.g. an optical telescope, as sighting device. A telescopic sight is generally rotatable about a vertical axis and about a horizontal tilting axis relative to a base of the measuring apparatus, such that the telescopic sight can be aligned with the point to be surveyed by pivoting and tilting. Modern apparatuses can comprise, in addition to the optical viewing channel, a camera for acquiring an image, said camera being integrated into the telescopic sight and being aligned for example coaxially or parallel, wherein the acquired image can be represented in particular as a live image on the display of the display/control units and/or on a display of the peripheral apparatus—such as e.g. the data logger—used for remote control.

Conventional surveying apparatuses in the meantime comprise as standard an automatic target tracking function for prisms serving as target reflector (ATR: "Automatic Target Recognition"). For this purpose, for example, a further separate ATR light source and a specific ATR detector (e.g. CCD area sensor) sensitive to this wavelength are additionally integrated in the telescope.

In many geodetic applications, points are surveyed by specifically configured auxiliary measuring instruments or target objects (e.g. surveying rods) being positioned at the target point. These usually consist of a plumb staff with a reflector (e.g. an all-round prism) for defining the measurement path or the measurement point. In the case of such surveying tasks, typically for the purpose of controlling the measurement process and for the purpose of defining or registering measurement parameters, data, instructions, speech and further information are transmitted between target object and central measuring apparatus. Examples of such data are identification information for the target object (e.g. type of prism used), inclination of the plumb staff, height of the reflector above ground, reflector constants or measured values such as temperature or air pressure. These items of information or situation-dictated parameters are required in order to enable highly precise targeting and surveying of the measurement point defined by the plumb rod with prism.

In addition, a determination of the spatial orientation or an inclination in relation to respectively relevant spatial directions of the respective auxiliary instrument is required or should be set in a defined manner (e.g. perpendicular) in order to derive, together with the determined position of the reflector arranged at the auxiliary instrument, the measurement point to be determined by means of the instrument. Such an orientation can be determined for example by means of an inclination sensor provided in a determined position and location relative to the reflector.

The use of inclination sensors permits a simple location determination in two rotational degrees of freedom. It is thereby possible to determine roll and pitch of the auxiliary measuring instrument, that is to say a respective rotation about a horizontal axis. It turns out to be technically more complex, however, to determine a third spatial direction, a rotation about a vertical axis, such as e.g. the longitudinal axis of the plumb staff, the so-called yaw of the auxiliary measuring instrument.

In this respect, the prior art discloses solutions by means of additional apparatuses on the part of the auxiliary measuring instrument. The respective apparatus here is illuminated e.g. on the part of the total station, etc., and the yaw angle can also be deduced on the basis of an angle of incidence or an imaging of a code. Such solutions are known, e.g. from EP 2 916 104 A1.

What is disadvantageous about solutions of this type is that in addition to the reflector typically present, at least one further component is provided at the auxiliary measuring instrument and, as a result, there is increased complexity with regard to the configuration of such instruments and/or the instruments have a relatively large spatial extent. Moreover, a determination of the alignment, in particular with regard to the use of inclination sensors, succeeds only within the scope of the respective limited sensor accuracy. Furthermore, the additional components each involve additional error sources with regard to the position and orientation determination (by way of example, an unintended angular offset of the inclination sensor relative to the reflector as a result of a mechanical stress leads to lower accuracy and/or corrupted values).

A solution in accordance with EP 1 200 853, wherein a prism has a small passage opening for the measurement beam and the latter partly impinges directly on a sensor (in a manner similar to that in the case of the imaging of a pinhole image camera) also has considerable disadvantages with regard to attainable accuracies. A precise determination of the position of the radiation on the sensor is afforded only in a highly conditional manner, since this determination accuracy is crucially dependent on the measurement distance, the beam quality and the environmental conditions (fog, rain, dust, etc.). Slight contamination, e.g. even in the form of a fingerprint on the prism exterior surface, can lead to asymmetrical imaging or deviation of the radiation transmitted through the small opening on the sensor and thus to a measurement error during evaluation e.g. by means of a threshold-value-based centroid determination. Since only a single very small spot is evaluated, corresponding error influences are practically undetectable and result in greatly restricted robustness for measurements outdoors. Moreover, in the case of a distance measurement with respect to this unit, on account of structurally dictated, reflector-internal reflections, considerable measurement errors can occur during the distance determination with respect to this unit.

SUMMARY

Therefore, it is an embodiment of the present invention to provide an improved, compact apparatus which enables a more reliable and more accurate orientation determination, in particular with up to three degrees of freedom (three rotational degrees of freedom), for surveying purposes. In particular, the intention is to provide a more reliable and more accurate location determination in up to six degrees of freedom, in three translational and in three rotational degrees of freedom.

This object is achieved by the realization of the characterizing features of the independent claims. Features which develop the invention in an alternative or advantageous manner can be gathered from the dependent patent claims.

Some aspects of the invention are based on the idea of incidence angle-correlated detection of the position of a code projection, which can be generated by electromagnetic radiation entering a reflector.

Some aspects of the invention relate to a reflector arrangement for position determination and/or marking of target points, in particular for industrially and/or geodetic surveying. The reflector arrangement comprises a retroreflector, which provides a position determination for the reflector arrangement by means of parallel, in particular coaxial, measurement beam reflection and provides a passage surface for at least one part of measurement radiation entering the retroreflector as orientation measurement radiation.

In geodetic surveying, tripe prisms or triple mirrors that provide a corresponding parallel beam reflection are typically used as retroreflector. If the reflector is targeted by a surveying apparatus, then the measurement radiation is reflected back to the surveying apparatus and, on the basis of the signal thus acquirable at the surveying apparatus, a distance with respect to the reflector can be determined, e.g. by means of time-of-flight calculation. A part, in particular a comparatively very small part of the entire measurement radiation cross section, can pass through the reflector and is not reflected back. The passage surface provided for this purpose can be produced e.g. by slicing off a corner of a triple prism.

The reflector arrangement additionally comprises a first sensor arrangement, by means of which the orientation measurement radiation passing through the retroreflector is acquirable. The sensor arrangement is disposed downstream of the retroreflector with respect to the direction of incidence of the measurement radiation into the reflector arrangement.

The first sensor arrangement comprises a first optical assembly providing a fisheye lens, and a first sensor. The optical assembly accordingly acts like a fisheye optical unit and preferably has the advantageous properties thereof with regard to the entire field of view providable above. The retroreflector and the first sensor arrangement are arranged in such a way that orientation measurement radiation passing through the retroreflector is deflectable or projectable, in particular focusable, onto the detection surface of the first sensor by means of the first optical assembly. "Projecting" the orientation measurement radiation should be understood here in particular synonymously with "deflecting and in particular focusing" the radiation onto the detection surface.

The provision of such an optical assembly provides an azimuthal all-round detection over a specific elevation range.

The optical axis of the first optical assembly is oriented in particular substantially parallel to the passage surface.

Furthermore, an optical axis defined by the first optical assembly can extend substantially orthogonal to a detection surface of the first sensor.

In one embodiment, the first optical assembly can define a field of view having a (total) elevation acquisition angle of up to 130° with respect to the optical axis and having an azimuthal acquisition angle of 360°. In this case, the detection surface of the first sensor is arranged in such a way that the field of view of the optical assembly is imagable onto the detection surface.

The first sensor can be configured for determining an impingement position of the orientation measurement radiation on the detection surface, in particular for determining a centroid of the impingement position.

The first sensor can be embodied for image acquisition, wherein, by means of the sensor, the impingement position of the orientation measurement radiation is acquirable in an image and is determinable as image position in the image.

In accordance with one embodiment, the reflector arrangement comprises an evaluation unit designed for deriving a spatial orientation of the reflector arrangement relative to the measurement radiation entering the retroreflector with respect to at least one degree of freedom on the basis of the impingement position, in particular wherein a yaw angle relative to a propagation axis of the entering radiation is determinable, in particular by means of continuous acquisition of the impingement position.

The impingement position of the radiation on the detection surface of the sensor correlates with an angle of incidence into the reflector arrangement. On the basis of a calibration of the sensor, an angle of incidence can be determined on the basis of the impingement position determined. By way of example, a look-up table or a function that expresses the correlation can be used for this purpose.

In one embodiment, the reflector arrangement can comprise a control unit having an acquisition functionality, wherein the acquisition functionality is configured for the spatially resolved detection of the orientation measurement radiation by means of multiple read-out of the sensor. In this case, at least a first read-out is effected with measurement information regarding orientation measurement radiation impinging on the detection surface and a second read-out is effected without said measurement information, in particular wherein the first read-out and the second read-out are effected in a manner synchronized with switching on and switching off an emission of the measurement radiation. The acquired measurement data can be used to derive difference information from which e.g. background or ambient light concomitantly acquired with the laser radiation has been eliminated.

An image acquisition by means of the sensor can thus be effected e.g. in the form of an alternating image acquisition alternatively with and without entering laser radiation. For this purpose, the laser light emission is switched on and off in a controlled manner on the part of the surveying apparatus (e.g. total station). As a result, it is possible to generate a difference image from which the ambient light acquired with the laser switched off has been eliminated, that is to say that the image information obtained with the laser switched off can be subtracted from the image information with the laser switched on.

The image recording is furthermore synchronized in particular with the switching of the laser of the measuring apparatus:

a surveying apparatus (e.g. total station) can emit a trigger signal in real time or with a predetermined time offset, e.g. a few micro- or milliseconds in advance, via radio, WLAN, Bluetooth, a conventional mobile radio standard, etc. The signal is acquired on the part of the reflector arrangement and is processed for the purpose of synchronized image acquisition, in particular taking account of the time offset.

Internal clocks both of the surveying apparatus and of the reflector arrangement are synchronized beforehand. A synchronism between image acquisition and light emission can thus be determined on the basis of the respective time. The sensor can then be driven accordingly on the basis of this information. A very accurate synchronization can be achieved by means of a hardware-supported NTP (Network Time Protocol).

Alternatively, the sensor can run asynchronously, that is to say that images can be acquired e.g. with a frame rate greater than the rate at which the laser is switched on and off. The synchronization can then be determined on the basis of the images. In this case, the frequency is known, but the phase has to be calculated, e.g. by means of "IQ Demodulation" (determination of a temporal correlation by sin( ) and cos( ) for each pixel or for groups of pixels.

Alternatively, either the laser switches upon every image (e.g. switch-on and switch-off cycle at 50 Hz and synchronous image acquisition at 100 Hz) or the laser switches more slowly (e.g. at 10 Hz) and a plurality of images are acquired per switch-on and switch-off phase, respectively.

In association with the image acquisition, a plurality of acquired images can be averaged in order to reduce noise in the image information.

The image sensor can be operated in particular in the binned mode (a plurality of pixels are summed or averaged in analog fashion and are read out with a higher frame rate). This reduces noise in two different regards: spatially (less noise per pixel in the binned mode) and temporally as a result of the higher frame rate.

In one embodiment, in a targeted manner just a partial region (Region of Interest) of the image sensor can be read out in order to save CPU power and rechargeable battery power and/or to increase the frame rate. The location of the partial region on the sensor is adapted in particular in real time (e.g. by means of locally resolved intensity monitoring or by means of image processing) in order to continuously provide the acquisition of the laser spot on the sensor.

When a measurement signal is received, it is possible to confirm reception to the surveying apparatus via a communication connection and, in the process, to transmit identification information for the targeted target (Target ID). The latter is advantageous if a plurality of 360° prisms or reflector arrangements are situated in the region of the surveying apparatus in order to avoid a possibly erroneous measurement onto a different reflector arrangement.

Moreover, it is possible to confirm the emission of a scanning search beam of the surveying apparatus for rapidly finding retroflectors in the measurement space by means of the reflector arrangement as soon as the emitted search radiation (e.g. in fan-type form) is acquired by the detector in the reflector arrangement.

The reflector arrangement can thus be used not only for the orientation determination but also for searching and finding (Power Search). In addition, the reflector arrangement can provide the communication of a self-identification (Target ID).

With regard to the configuration of the optical assembly, in accordance with one embodiment, the first optical assembly can comprise a plurality of spherical lens elements, in particular two, and/or an optical component having an aspherical surface, in particular wherein the spherical lens elements and/or the optical component are/is produced from glass or plastic. The use of glass, in contrast to many other materials, makes it possible to attain a comparatively high refractive index, in particular of greater than 2.

In one embodiment, the reflector arrangement can comprise an optical coupling element between the retroreflector and the optical assembly.

The optical coupling element can contact the retroreflector and/or the optical assembly.

An interaction of the optical coupling element with the retroreflector and the optical assembly provides an increased light refractive power of the reflector arrangement.

Moreover, a filter can be disposed upstream of the sensor. Said filter can be embodied and adapted in wavelength-selective fashion in such a way that measurement radiation of a geodetic surveying apparatus reaches the sensor, but disturbing ambient radiation or disturbing reflections are filtered out. The filter can be part of the optical assembly, for example.

In particular, the optical coupling element can be embodied as an anamorphic coupling element, in particular whereby different refractive powers are provided in different directions orthogonal to an optical axis of the coupling element, and the optical system has different refractive powers e.g. in horizontal and vertical directions. As a result, the anamorphic coupling element provides a refractive power in a first direction which is different from a refractive power in a second direction. This results in an additional degree of freedom in the configuration of the optical system. In this regard, an elevative field of view can be generated, for example, which is correspondingly different (large) relative to an azimuthal field of view. The total field of view can thus advantageously be adapted in conjunction with the fisheye properties of the system.

In one embodiment, the passage surface can be aligned at a defined angle obliquely with respect to the optical axis of the assembly. In an embodiment in which there is an air gap between coupling element and prism, this can be particularly advantageous. By adapting the angle, it is possible for total internal reflection to be avoided or reduced to a smaller range.

In accordance with one embodiment of the invention, the retroreflector can be embodied as a prism, in particular a triple prism, in particular in reflectively coated fashion. The prism can comprise a light entrance surface forming a triangle and the passage surface situated opposite the light entrance surface as aperture. Part of radiation entering the prism can leave the prism at the rear side thereof through the passage surface without being reflected.

The passage surface can be formed at a corner of the prism, in particular wherein the passage surface is formed by a cut-out termination of a prism corner (e.g. sliced-off corner) of the prism and likewise defines a triangle. The optical axis defined by the first optical assembly can extend parallel to the passage surface.

In one embodiment, the reflector arrangement is constructed as a 360° retroreflector, comprising a plurality of, in particular comprising six, retroreflectors embodied in accordance with an embodiment above, said retroflectors being arranged in a manner adjoining one another and being embodied as prisms. The plurality of the prisms are arranged in ring-shaped fashion, in particular form a ring, and the 360° retroreflector defines an azimuthal total field of view of 360°.

A central axis (e.g. perpendicular bisector of the area enclosed by projecting the prisms onto a plane) defined by the ring-shaped arrangement of the prisms extends parallel or coaxially with respect to the optical axis of the first optical assembly.

In one embodiment, the optical axes of at least two, in particular three, prisms can have a common point of intersection with the central axis, wherein the position of an optical axis of a prism is defined by the respective midpoints of the light entrance surface of said prism and of the passage surface of said prism.

In accordance with one specific embodiment, the reflector arrangement can comprise a second sensor arrangement comprising a second optical assembly and a second sensor, wherein the first sensor arrangement is assigned to a first prism group and the second sensor arrangement is assigned to a second prism group, in particular wherein the first and second prism groups each comprise three prisms.

In particular, the first prism group and the first sensor arrangement can provide an acquisition, by the first sensor, of the orientation measurement radiation which is providable by the first prism group and is projectable onto the first sensor by means of the first optical assembly. The second prism group and the second sensor arrangement can provide an acquisition, by the second sensor, of the orientation measurement radiation which is providable by the second prism group and is projectable onto the second sensor by means of the second optical assembly.

In one embodiment, the optical axis of the first sensor arrangement and the optical axis of the second sensor arrangement can be aligned (relative to one another) parallel or coaxially, wherein the respective acquisition directions of the first sensor arrangement and the second sensor arrangement are opposite.

In one embodiment, the midpoints of the passage surfaces of the prisms of the first prism group can lie in a first plane and the midpoints of the passage surfaces of the prisms of the second prism group can lie in a second plane wherein the first plane and the second plane are aligned parallel to one another and are at a specific distance, in particular wherein the planes can lie substantially orthogonal to the optical axis defined by the first optical assembly.

The prisms of one respective prism group are arranged offset with respect to the prisms of another respective prism group with regard to a position on the central axis.

In accordance with one embodiment, the reflector arrangement can have a total field of view with an elevative acquisition angle, i.e. total aperture angle of the field of view in the elevation direction, of at least 30° and up to 60° and an azimuthal acquisition angle of 360°.

Some aspects of the invention furthermore relates to an auxiliary measuring instrument, in particular plumb rod, surveying rod or probe tool, comprising a reflector arrangement according to an embodiment described above. The auxiliary measuring instrument is embodied for the non-contact or tactile acquisition of a target point at an object with a defined position reference with respect to the reflector arrangement. By means of the reflector arrangement, the position and orientation of the auxiliary measuring instrument can be determined unambiguously in up to 6 degrees of freedom. In this case, the reflector arrangement is used in particular for determining the azimuth relative to the line of sight between surveying apparatus and auxiliary measuring instrument.

By providing a sensor on the measuring rod and acquiring characteristic measurement radiation of a total station, etc., it is possible for the measuring rod to be embodied as an active auxiliary means. For this purpose, the measuring rod can comprise a transmitting unit and be embodied for communicating information. By way of example, the measuring rod can generate a signal in response to detection of a search beam and thereby notify the total station that the radiation then impinges on the reflector (search process for finding a geodetic target). In addition, it is possible to transmit an ID for the determined target and thus to indicate which target has been found or is currently being targeted.

In the other direction, information can also be transmitted to the measuring rod. This does not necessitate an additional receiver on the part of the rod, rather the information can be transported by means of modulated electromagnetic radiation and be acquired by the sensor.

Furthermore, the sensor in the reflector arrangement can also be embodied for general image acquisition, besides the acquisition of the measurement radiation. The acquisition and evaluation of images of the surroundings can contribute e.g. to the location and position determination of the measuring rod.

BRIEF DESCRIPTION OF THE DRAWINGS

The method according to the invention and the apparatus according to the invention are described in greater detail purely by way of example below on the basis of specific exemplary embodiments illustrated schematically in the drawings, further advantages of the invention also being discussed. In the figures, specifically.

DETAILED DESCRIPTION

Figure 1:
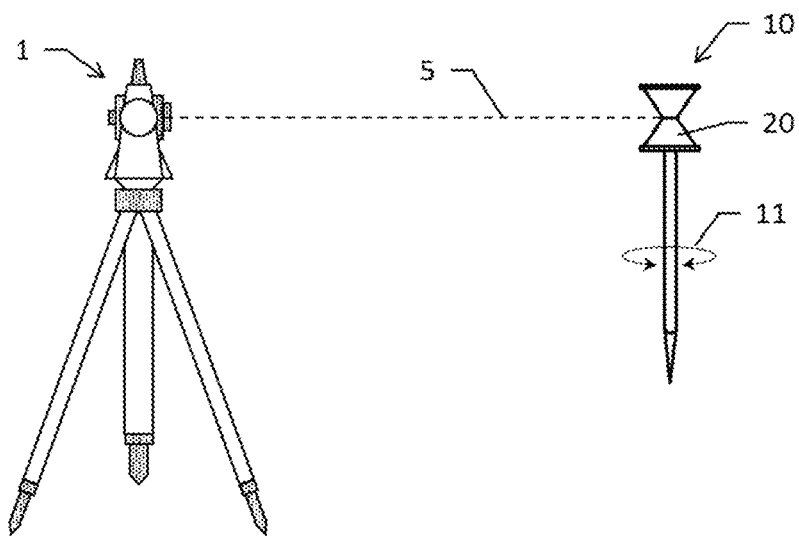
FIG. 1 shows a geodetic surveying system comprising a reflector arrangement according to the invention.

FIG. 1 shows a surveying apparatus 1, in particular configured as a total station or a multistation, comprising a base, a support, which is pivotable about a pivot axis relative to the base, and a targeting unit, which is pivotable about two axes—pivot and tilt axes. A measurement laser beam 5 is emitted from the targeting unit and impinges on a reflector arrangement 20 according to the invention of an auxiliary measuring instrument embodied as a plumb rod 10. (Collimated) laser radiation that is generatable by a laser diode provided at the surveying apparatus 1 is typically used as measurement radiation 5. The reflector arrangement 20 has a retroreflector and a sensor arrangement.

For a distance measurement, the measurement radiation 5 is reflected back parallel by the retroreflector and, on the part of the surveying apparatus 1, is acquired and evaluated with regard to distance information, for example by means of a time-of-flight measurement. The location of the auxiliary measuring instrument 10 can be ascertained on the basis of the determination of the angular position of the targeting unit, that is to say the emission direction of the laser 5.

For determining the orientation of the auxiliary measuring instrument 10, at least with regard to a rotational degree of freedom 11, in particular yaw, according to the invention a part of the radiation 5 that impinges on the reflector arrangement 20 and is not reflected passes through the retroreflector and is guided by means of a fisheye optical unit onto an optically downstream sensor, in particular image sensor. On the basis of an impingement position of the part of the radiation that passes through on the sensor, it is possible to determine a direction angle for the at least one degree of freedom in relation to the emission direction of the measurement radiation 5. Spatial position and orientation of the surveying apparatus 1 are typically known during a survey. In this regard, it is possible to determine an absolute orientation of the measuring rod 10 in space, i.e. in the coordinate system in which the surveying apparatus 1 is calibrated.

Figure 2:
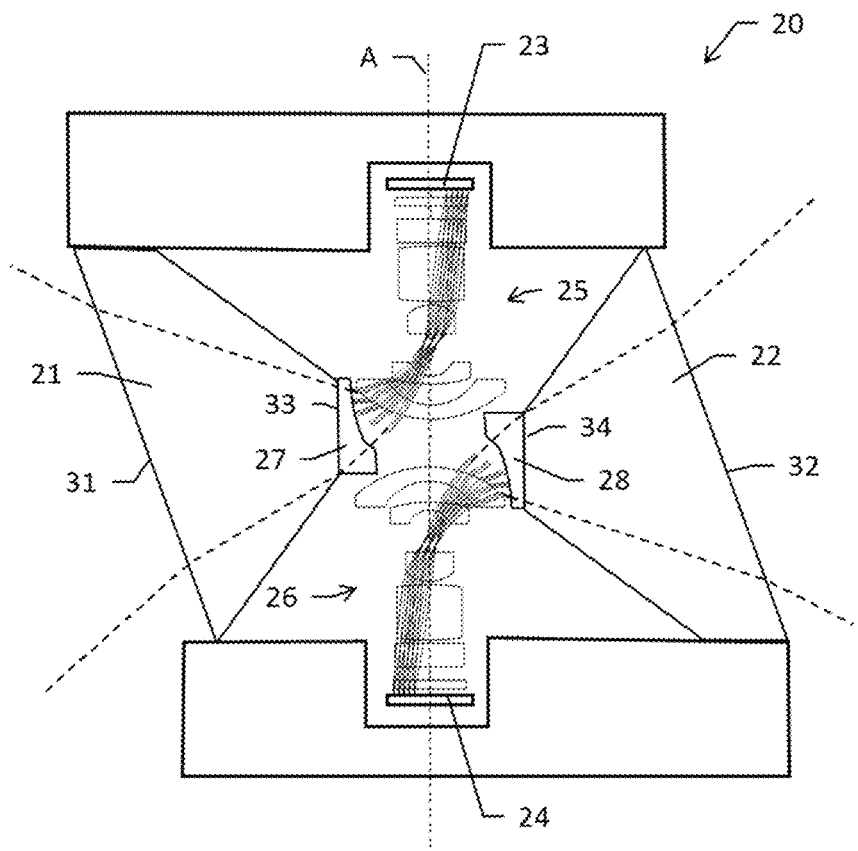
FIG. 2 shows one embodiment of a reflector arrangement according to the invention in cross section.

FIG. 2 shows a reflector arrangement 20 according to the invention in longitudinal cross section through the center of said reflector arrangement.

The reflector arrangement 20 is configured as a 360° retroreflector and thus provides a back-reflection of measurement radiation over an azimuthal angle range of 360°. The reflector arrangement 20 comprises six individual triple prisms, which produce the total reflection range of 360° as a result of their relative, ring like arrangement. FIG. 2 shows in a representative manner two opposite prisms 21 and 22 of the total of six prisms likewise in cross section.

The reflector arrangement 20 additionally comprises two sensors 23 and 24 and also two optical assemblies 25 and 26. The optical assemblies 25, 26 are constructed in each case such that they provide a respective fisheye lens, having the imaging properties specific to such a lens. A detailed illustration of such an assembly can be found in FIG. 4.

The prisms 21, 22 comprise, at an end side facing outward, respective light entrance surfaces 31, 32 and respective opposite passage surfaces 33, 34, pointing in the direction of the center of the arrangement. In the case of a triangular prism 21, 22, such a light passage surface 33, 34 can be embodied for example by removing (e.g. slicing off, grinding away, polishing away) the triple corner on the optical axis.

In addition, optical coupling elements 27 and 28 are arranged between the prisms 21, 22 and the optical assemblies 25, 26. In this case, a coupling element 27, 28 can be attached (e.g. adhesively bonded) directly to a prism 21, 22 or be positioned with a defined gap relative to the prism. By means of the arrangement of said coupling elements 27, 28, it is possible to achieve an increase in the total refractive power of the system (coupling element and optical assembly), thereby providing an optimization of the field of view in particular with regard to avoiding visual interruptions with regard to the azimuthal and/or elevative viewing angle.

The coupling elements 27, 28 are preferably produced from cycloolefin copolymer (COC) or polycarbonate (PC), but can also be produced from glass, e.g. by 3D printing.

A total field of view resulting from the arrangement shown, i.e. over an azimuthal angle range of 360°, provides throughout a viewing angle (elevation) of at least ±30° in the elevation direction (orthogonally to the azimuth; total aperture angle of at least 60°, relative to the horizontal plane).

In particular, in accordance with one specific embodiment, an elevation of ±15° (relative to the horizontal plane) can be imaged at least substantially throughout.

One advantage of this reflector arrangement 20 of a 360° reflector is that the optical axis of the sensor is substantially coaxial with the prisms as a result of the refraction of light by means of a specific optical assembly and an adapted coupling element. The measurement radiation of the distance measuring unit of a total station can thus simultaneously be used for determining the orientation of the reflector arrangement 20 or of a pole carrying this arrangement. In addition, the sensor arrangement is fully integrated into the reflector and not visible from outside. The reflector arrangement 20 is thus embodied very compactly. A further advantage is the resultant very good insulation against environmental influences (e.g. moisture, dust) from outside. The total weight increase of the arrangement remains comparatively small as a result of the provision of the integrated components.

As shown in FIG. 2, firstly, respectively opposite prisms 21, 22 are offset with regard to their positioning along the central axis A and, secondly, the angle between the passage surface 33 and the entrance surface 31 of the first prism 21 and the passage surface 34 and the entrance surface 32 of the second prism 22 is preferably identical in terms of absolute value, but opposite with regard to direction. In the exemplary embodiment shown, respectively adjacent prisms are correspondingly aligned differently.

On account of this offset arrangement—three upwardly inclined prisms and three downwardly inclined prisms—a respective combination of optical assembly and sensor is assigned to the three upwardly inclined prisms and the three downwardly inclined prisms.

Each of the two sensors 23, 24 is arranged and designed for acquiring light from three prisms in each case. Each prism is assigned a coupling element, wherein the coupling elements can be combined in an integrated design as an integral component (cf. FIG. 5c).

As a result of the fisheye characteristic of the optical assemblies 25, 26, each of these assemblies provides an imaging property suitable for the desired acquisition angle range. Each fisheye lens images the radiation incident in a defined lens field of view onto the assigned sensor. In the example shown, each optical assembly provides the desired imaging of radiation from three prisms—inclined identically with respect to the central axis A—of the total of six prisms onto the respective sensor.

Figure 3:
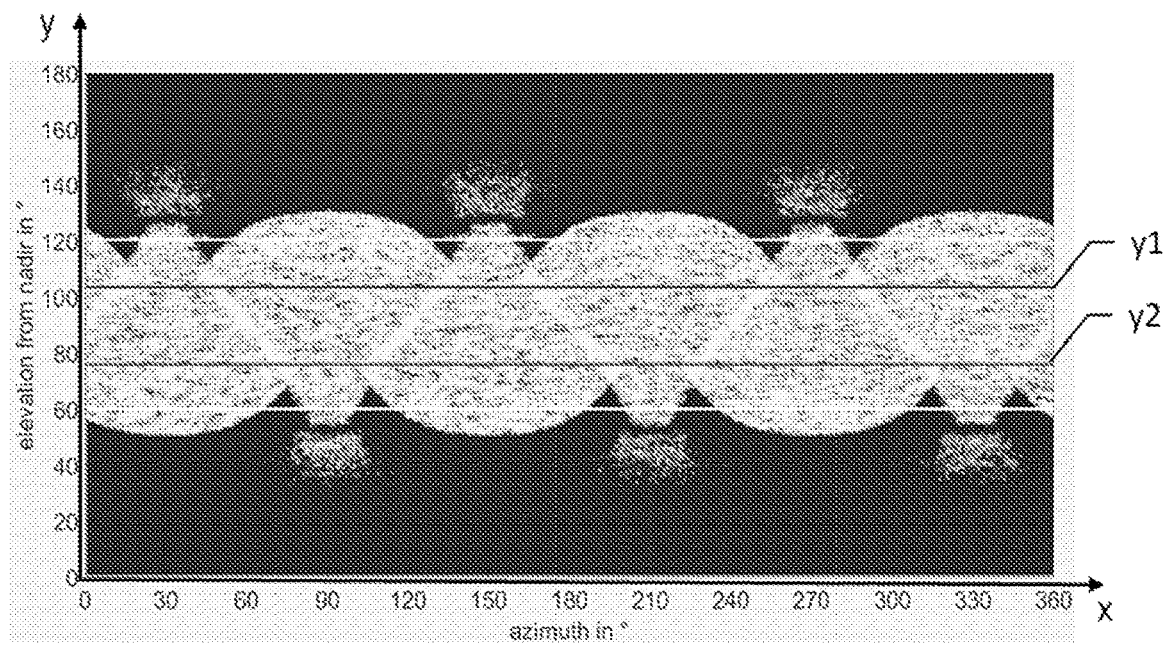
FIG. 3 shows a field of view that is providable by a reflector arrangement according to the invention.

FIG. 3 shows a spatial coverage of the field of view with a reflector arrangement 20 according to one embodiment according to the invention. The respectively acquirable elevation angle is plotted in the y-direction against the azimuth (0°-360°), imagable in the x-direction. The elevative field of view—acquirable over the entire azimuth range of 0°-360° of ±15° (here with respect to 90° azimuth (horizontal plane)) is illustrated by two lines y1 and y2. Each of the circle-sector-shaped regions represents the field of view of a prism in combination with a coupling element assigned to said prism and a correspondingly assigned optical assembly. An interaction of six such combinations provides the acquirability throughout with respect to the azimuth.

In an alternative embodiment (not shown), a 360° coverage can already be provided with an arrangement of four combined sets comprising prism and assigned coupling element.

It goes without saying that in a further alternative embodiment (not shown), it is possible to provide a single prism in combination with a single optical assembly and a single sensor. The field of view is correspondingly restricted here to the geometric and optical configuration in particular of the prism used. As a result, however, the advantages with regard to a large field of view provided are applicable to a single reflector, wherein an advantageous arrangement of optical assembly and sensor can contribute to a compact and flexible configuration.

The sensors 23, 24 can be embodied for example as image sensors (CCD or CMOS) or as position-resolving detectors that are sensitive with respect to the wavelength of the measurement radiation.

The reflector arrangement 20 provides a determination of the spatial orientation in particular with respect to a yaw movement, i.e. a rotation of the reflector arrangement 20 about the central axis A. The other two rotational degrees of freedom, roll and pitch angles, can be determined e.g. by means of gravitation inclinometers or (in part) likewise on the basis of the reflector arrangement 20. For the purpose of determining the orientation, in all three rotational degrees of freedom, the measurement data acquired for this purpose are preferably processed jointly. If e.g. roll and pitch locations are determined by means of an inclination sensor, the azimuthal orientation of the measuring rod with respect to the total station can be calculated unambiguously.

The measurement of yaw is apparatus-fixed, that is to say that the measurement is effected relative to the pole axis. An inclination sensor (inclinometer) measures relative to gravitation. If a measuring rod thus stands at least substantially vertically, yaw takes place correspondingly parallel to the azimuth, and all three spatial angles can be determined in a simple manner. The greater the deviation of the location of the measuring rod from a vertical alignment becomes, the lower the resulting measurement accuracy becomes, but the system according to the invention allows a reliable complete spatial orientation determination (with an additional inclination sensor) at least up to an inclination of the measuring rod of 70° or 80°.

The 360° surroundings of the reflector arrangement 20 are imaged in a distorted manner as a ring element on the sensor, wherein the center of the ring can be regarded as the coordinate origin of a polar diagram. The yaw angle can be determined from the angular position of the imaged measurement beam 5. The radial location is determined by the pitch angle, which can also be determined from the latter.

If the measurement radiation 5 is polarized, with the use of a polarization-resolving image sensor (e.g. Sony IMX250MZR), e.g. from the calculation of the Stokes vector over four adjacent polarization pixels with different polarization-sensitive matrix elements, the third degree of freedom, the roll angle of the measuring rod, can also be determined purely by way of the optical detection of the measurement radiation 5. Such an embodiment is particularly advantageous since all three rotational degrees of freedom can be determined solely on the basis of the optical measurement data.

In other words, at least the first sensor can be embodied as a polarization-resolving sensor, wherein adjacent sensor pixels are assigned differently polarization-sensitive matrix elements and the sensor provides a calculation of the Stokes vector on the basis of an intensity evaluation of the adjacent sensor pixels.

The orientation determination by means of the reflector arrangement 20 is effected on the basis of and relative to the propagation axis of the measurement radiation impinging on the arrangement 20, e.g. emitted on the part of a total station. The measurement radiation then passes partly through one of the prisms and is deflected and focused onto the sensor by the coupling element and by means of the optical assembly.

The sensor is embodied for this purpose or is driven/read out such that an impingement position on the detection surface of the sensor is determinable for the impinging measurement radiation. This can be done for example by means of a centroid determination for the impinging radiation. For this purpose, it is possible (in particular depending on the type of sensor) to carry out e.g. an intensity consideration over the sensor area. Alternatively or additionally, an image generatable by the sensor and comprising the impinging radiation in imaged fashion can be evaluated by means of image processing. In this case, e.g. brightness or contrast evaluations can be applied in order to derive the impingement position.

Besides the signal of the measurement radiation 5, the ring-shaped background image of the surroundings of the reflector arrangement can also be used for position determination and registration e.g. in the case of the offsetting of the measuring rod with undesired measurement beam interruption or else in order to map the surroundings (SLAM).

Support by inertial sensors (IMU) is likewise possible in order to further increase the measurement stability in the case of a measurement beam interruption.

On account of the configuration of the reflector arrangement 20, the impingement position on the sensor correlates with the angle of incidence of the radiation into the prism. The azimuth of the reflector arrangement 20 with respect to the propagation axis of the measurement radiation can thus be derived on the basis of the impingement position determined.

If the reflector arrangement 20 is rotated about the axis A with incident measurement radiation, the impingement position of the radiation on the sensor changes. In particular, the change in the impingement position in this case describes a circle arc on the sensor. In this case, if the measurement radiation leaves the field of view of a prism and enters the field of view of an adjacent prism, then the measurement radiation no longer impinges on the previous sensor, but rather is directed onto the opposite sensor. Upon further rotation, here as well a circle arc is described on the detection surface.

According to the invention, the evaluation of the orientation can alternatively be effected not just solely on the basis of an image, rather continuous monitoring of the impingement position can be effected and an orientation can be deduced from a respective change in the impingement position (likewise continuously).

Since the radiation from in each case three prisms is fed to each of the sensors 23 and 24 and said prisms are azimuthally offset (e.g. by 60° in each case), the sensors acquire the radiation in particular on in each case three sectors on their detection surfaces.

Figure 4:
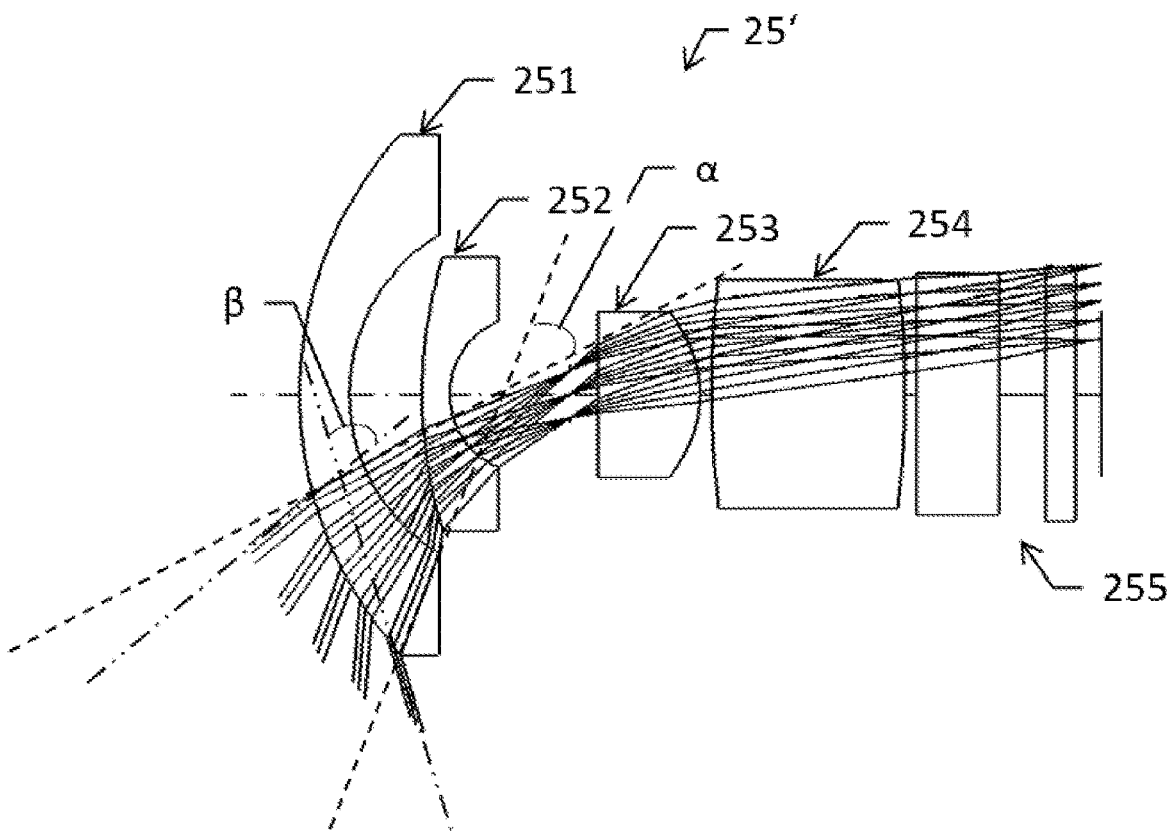
FIG. 4 shows an optical assembly of a reflector arrangement according to the invention.

FIG. 4 shows one embodiment of a construction of an optical assembly 25' used according to the invention. The assembly 25' comprises four lens elements 251-254 and a bandpass filter 255. The lens elements 251-254 are preferably produced from glass in order to provide a high refractive index. The aspherically shaped lens elements are produced by means of precision casting, in particular.

In one specific embodiment, the assembly 25' comprises at least two lens elements and a bandpass filter. At least the first lens element, in particular the first two lens elements in the direction of light incidence, is/are preferably produced from glass in order to provide a high refractive index of, for example, greater than 1.7. The lens element, in particular the first two lens elements, has/have a negative refractive power and is/are curved in meniscus-shaped fashion. An aperture stop then follows. Lens elements possibly arranged downstream of the aperture stop can have a positive refractive power.

In this case, the coupling elements can generate astigmatic aberrations as a result of their anamorphism. The optical assembly can then be designed such that the astigmatism generated by the coupling elements is partly compensated for, with the result that the orientation measurement radiation is focused to the smallest possible spot on the detection element. The focusing to the smallest possible spot enables a good differentiation of the focused orientation measurement radiation from possible disturbing light that can emanate e.g. from brightly illuminated buildings.

By way of example, the figure shows the beam paths through the optical assembly 25' within a geometric angular range α with respect to the first lens element. The optical beam path of radiation entering said range α and the viewing range β provided as a result are shown in comparison. According to the invention, the ratio α:β can be at least 1:1.5 or 1:2.

Figures 5A, 5B:
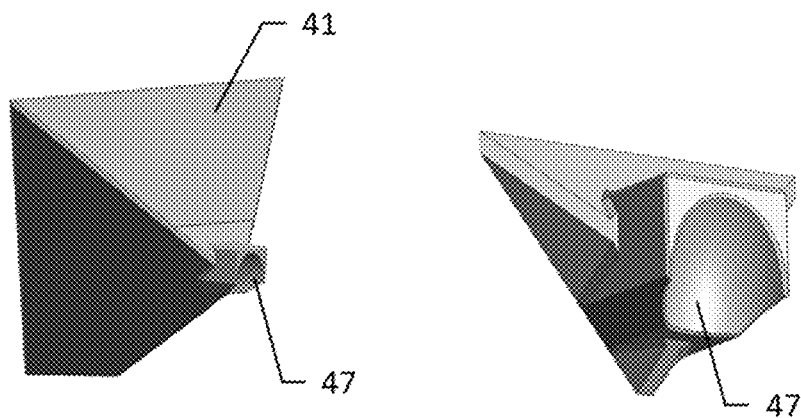
FIGS. 5a-c show embodiments of a coupling element according to the invention.

FIG. 5a shows a combination of a prism 41 with a coupling element 47 of a reflector arrangement according to the invention. FIG. 5b shows the coupling element 47 in an enlarged, perspective illustration. The coupling element 47 is produced e.g. from glass or cycloolefin copolymer (COC) or polycarbonate (PC) and is designed for manipulating the beam passage direction of measurement radiation that is emittable by a geodetic surveying apparatus. The coupling element 47 thereby contributes to a desired increase in the optical refractive power of a reflector arrangement.

The coupling element 47 is contacted onto a sliced-off corner of the prism lying on the optical axis of the prism 41. The coupling element 47 can be attached by adhesive bonding, for example. Measurement radiation that is not reflected by the prism 41, i.e. measurement radiation that impinges on the passage surface formed by the cut-out corner of the prism, leaves the prism at the rear side thereof and is deflected by the coupling element 47.

Figure 5C:
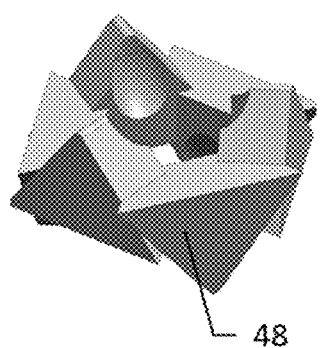

FIG. 5c shows a further embodiment of the coupling element 48. This involves an integrated combination of six individual elements. The coupling element 48 is provided in particular for use in a reflector arrangement 20 according to FIG. 2 and is simultaneously connectable to six prisms. As a result, the radiation passing through said prisms (optionally or simultaneously) is deflected in each case in a desired manner and in particular projected onto a downstream optical assembly.

Modern production methods also allow the direct integration of the coupler function into the design of the prism by way of the production of freeform surfaces. In this way, an additional component is saved and temperature effects at different material interfaces are avoided. The coupling element 48 can thus be embodied as an integrated constituent of the prism, in particular integrally with the prism.

It goes without saying that these figures illustrated merely schematically illustrate possible exemplary embodiments. According to the invention, the various approaches can likewise be combined with one another and with geodetic surveying systems from the prior art.

What is claimed is:

1. A reflector arrangement for position determination or marking of target points, the reflector arrangement comprising:
   a retroreflector, which:
      provides a position determination for the reflector arrangement by means of parallel measurement beam reflection, and
      provides a passage surface for at least one part of measurement radiation entering the retroreflector as an orientation measurement radiation; and
   a first sensor arrangement, by means of which the orientation measurement radiation passing through the retroreflector is acquirable, wherein the first sensor arrangement includes:
      a first optical assembly, and
      a first sensor,
   wherein the retroreflector and the first sensor arrangement are arranged in such a way that the orientation measurement radiation passing through the retroreflector is deflectable onto a detection surface of the first sensor by means of the first optical assembly.

2. The reflector arrangement according to claim 1, wherein the first optical assembly defines a field of view having:
   an elevative acquisition angle of up to 130° with respect to the optical axis,
   an azimuthal acquisition angle of 360°,
   the detection surface of the first sensor is arranged in such a way that the field of view of the first optical assembly is imagable onto the detection surface of the first sensor, and
   the reflector arrangement has a total field of view having:
      i. an elevative acquisition angle of at least 30° and up to 60°.

3. The reflector arrangement according to claim 1, wherein the first sensor:
   a. is configured for determining an impingement position of the orientation measurement radiation on the detection surface of the first sensor, or
   b. is embodied for image acquisition and the impingement position of the orientation measurement radiation is acquirable in an image.

4. The reflector arrangement according to claim 3, wherein:
   a. the reflector arrangement comprises an evaluation unit designed for deriving a spatial orientation of the reflector arrangement relative to a propagation axis of the measurement radiation entering the retroreflector with respect to at least one degree of freedom on the basis of the impingement position.

5. The reflector arrangement according to claim 1, wherein:
   a. the first optical assembly comprises a plurality of spherical lens elements or an optical component having an aspherical surface.

6. The reflector arrangement according to claim 1, wherein:
   a. the reflector arrangement comprises an optical coupling element between the retroreflector and the optical assembly, wherein
      i. an interaction of the optical coupling element with the retroreflector and the first optical assembly provides an increased light refractive power of the reflector arrangement, and
      ii. the optical coupling element contacts the retroreflector or the first optical assembly.

7. The reflector arrangement according to claim 6, wherein the optical coupling element is embodied as an anamorphic coupling element.

8. The reflector arrangement according to claim 1:
   a. the retroreflector is embodied as a prism, wherein the prism comprises:
      i. a light entrance surface forming a triangle, and
      ii. the passage surface as aperture, said passage surface being situated opposite the light entrance surface.

9. The reflector arrangement according to claim 1:
   a. the reflector arrangement is embodied as a 360° retroreflector comprising a plurality of retroreflectors, said retroreflectors being arranged in a manner adjoining one another and being embodied as prisms, wherein
      i. the plurality of prisms are arranged in a ring-shaped manner, and
      ii. the 360° retroreflector defines an azimuthal total field of view of 360°.

10. The reflector arrangement according to claim 9, wherein:
   a. the reflector arrangement comprises a second sensor arrangement comprising a second optical assembly and a second sensor, wherein the first sensor arrangement is assigned to a first prism group and the second sensor arrangement is assigned to a second prism group.

11. The reflector arrangement according to claim 10, wherein:
   i. the first prism group and the first sensor arrangement provide an acquisition, by the first sensor, of the orientation measurement radiation which is providable by the first prism group and is projectable onto the first sensor by means of the first optical assembly, and
   ii. the second prism group and the second sensor arrangement provide an acquisition, by the second sensor, of the orientation measurement radiation which is providable by the second prism group and is projectable onto the second sensor by means of the second optical assembly.

12. The reflector arrangement according to claim 9, wherein:
   i. the midpoints of passage surfaces of the plurality of prisms of a first prism group lie in a first plane and the midpoints of passage surfaces of the prisms of a second prism group lie in a second plane, and
   ii. the first plane and the second plane are aligned parallel to one another and are at a specific distance.

13. The reflector arrangement according to claim 1, wherein:
   a. at least the first sensor is embodied as a polarization-resolving sensor,
      wherein:
      i. adjacent sensor pixels are assigned differently polarization-sensitive matrix elements, and
      ii. the first sensor provides a calculation of the Stokes vector on the basis of an intensity evaluation of the adjacent sensor pixels.

14. The reflector arrangement according to claim 1, wherein:
   a. the reflector arrangement comprises a control unit having an acquisition functionality, wherein the acquisition functionality is configured for the spatially resolved detection of the orientation measurement radiation by means of multiple read-out of the first sensor, wherein at least a first read-out is effected with measurement information regarding orientation measurement radiation impinging on the detection surface of the first sensor and a second read-out is effected without said measurement information.

15. An auxiliary measuring instrument comprising a reflector arrangement according to claim 1, wherein the auxiliary measuring instrument is embodied for the non-contact or tactile acquisition of a target point at an object with a defined position reference with respect to the reflector arrangement.

* * * * *